(12) United States Patent
Wibisono

(10) Patent No.: US 7,673,251 B1
(45) Date of Patent: Mar. 2, 2010

(54) PANEL PRESENTATION

(75) Inventor: Himgan Wibisono, Berkeley, CA (US)

(73) Assignee: Adobe Systems, Incorporated, San Jose, CA (US)

( * ) Notice: Subject to any disclaimer, the term of this patent is extended or adjusted under 35 U.S.C. 154(b) by 360 days.

(21) Appl. No.: 11/541,852

(22) Filed: Oct. 2, 2006

(51) Int. Cl.
*G06F 3/048* (2006.01)

(52) U.S. Cl. ................................ 715/771; 764/766

(58) Field of Classification Search .............. 715/764, 715/771, 766
See application file for complete search history.

(56) References Cited

U.S. PATENT DOCUMENTS

| | | | | |
|---|---|---|---|---|
| 5,651,107 | A * | 7/1997 | Frank et al. | 715/768 |
| 5,874,958 | A * | 2/1999 | Ludolph | 715/781 |
| 5,917,483 | A * | 6/1999 | Duncan et al. | 715/802 |
| 6,195,094 | B1 * | 2/2001 | Celebiler | 715/764 |
| 6,262,724 | B1 * | 7/2001 | Crow et al. | 715/723 |
| 6,285,364 | B1 * | 9/2001 | Giordano et al. | 715/804 |
| 6,310,631 | B1 * | 10/2001 | Cecco et al. | 715/792 |
| 6,452,609 | B1 * | 9/2002 | Katinsky et al. | 715/716 |
| 6,628,310 | B1 * | 9/2003 | Hiura et al. | 715/776 |
| 6,832,355 | B1 * | 12/2004 | Duperrouzel et al. | 715/788 |
| 6,918,091 | B2 * | 7/2005 | Leavitt et al. | 715/765 |
| 7,069,515 | B1 * | 6/2006 | Eagle et al. | 715/747 |
| 2002/0154163 | A1 * | 10/2002 | Melchner | 345/749 |
| 2005/0025363 | A1 * | 2/2005 | Lui et al. | 382/187 |
| 2006/0055670 | A1 * | 3/2006 | Castrucci | 345/157 |
| 2006/0271869 | A1 * | 11/2006 | Thanu et al. | 715/764 |
| 2007/0016875 | A1 * | 1/2007 | Santos-Gomez | 715/798 |

OTHER PUBLICATIONS

"Method to allow users to select transparent color for windows", Research Disclosure Database #347065, Published Mar. 1993, 2 pages.*
"Windows XP in 10 Steps or Less", by Bill Hatfield, Published in 2004, pp. i, ii, 354.*
W3C. "Cascading Style Sheets, level 2 revision1, CSS 2.1 Specification." [Online]. Mar. 3, 2008. <http:www.w3.org/TR/2006/WD-CSS21-20060411/>.

* cited by examiner

*Primary Examiner*—William L Bashore
*Assistant Examiner*—Gregory A Distefano
(74) *Attorney, Agent, or Firm*—Robert C. Kowert; Meyertons, Hood, Kivlin, Kowert & Goetzel, P.C.

(57) ABSTRACT

Panel presentation is described, including presenting a foreground panel over a background panel, detecting an input associated with the background panel, the input being configured to invoke the background panel, and rendering the foreground panel and the background panel in a substantially similar region of an interface, the foreground panel and the background panel being rendered without modifying the foreground panel.

21 Claims, 13 Drawing Sheets

PANEL PRESENTATION

FIELD OF THE INVENTION

The present invention relates generally to software, computer programs, applications, and user interfaces. More specifically, panel presentation is described.

BACKGROUND OF THE INVENTION

Display or presentation ("presentation") of content is affected by a given user or set of users' preferences. Graphical user interfaces ("interfaces") are typically designed and implemented for use with various types of software, computer programs, or applications ("applications"), including web browsing, desktop or client applications, distributed applications, enterprise applications, customer relationship management (CRM), enterprise resource planning (ERP), visual and graphical design, content portals, electronic commerce, and others. Interfaces facilitate how users interact with applications, often providing graphical, visual, or other media-based elements that allow intuitive interaction. Factors such as the design, style, fonts, color, layout, font type, format, and others are used to develop an interface. However, there are several limitations to conventional interfaces.

In some conventional interfaces, specific or customized programming or "coding" is required due to specific design, structural (i.e., integration with operating systems, other applications, or as part of an application), functional, or usability requirements. Conventional coding techniques typically require extensive time, labor, expensive development applications, and other resources to develop an interface for a specific set of needs. Customization of conventional interfaces often requires further time and labor, or even specialized resources such as elaborate web design applications. For example, to develop a "skin" or packaged graphical user interface appearance for a website may take substantial amounts of time and expert labor in order to support the individual needs of a particular group of users. If user needs change, then more time, labor, and, perhaps, additional specialized design applications may be required. Further, changing the appearance of an interface or substituting a new interface or skin to address different users or user groups is expensive and difficult, increasing in complexity in direct proportion with the number of users. Still further, conventional interfaces are limited in functionality and can restrict the amount of information that can be presented in a given window, screen, panel, or the like.

In other conventional solutions, the amount of information or data to be presented is limited by the design, layout, and appearance of a given interface. For example, using a particular background pattern may be appealing to some users, but distasteful to others, but can limit the amount of information presented on an interface for an application. As another example, the layout of an interface may be designed to appeal to a certain set of users. However, this may limit the amount or types of information that a user may see. Subsequently, users are forced to open multiple interfaces to retrieve or view additional information. Superfluous tabbed screens, windows, pop-up windows, or altogether new interfaces may be required. This results in disruptive user experiences, forcing users to open and switch between different or multiple interfaces, which is inefficient and time intensive. The limitations of conventional interfaces result in incomplete transactions on an electronic commerce site, reduced usage of a website (e.g., content portal, blog, or other type of content-oriented website), content, application, tool, or interface.

Thus, a solution for presenting information and data in interfaces without the limitations of conventional techniques is needed.

BRIEF DESCRIPTION OF THE DRAWINGS

Various examples are disclosed in the following detailed description and the accompanying drawings.

DETAILED DESCRIPTION

Figure 1:
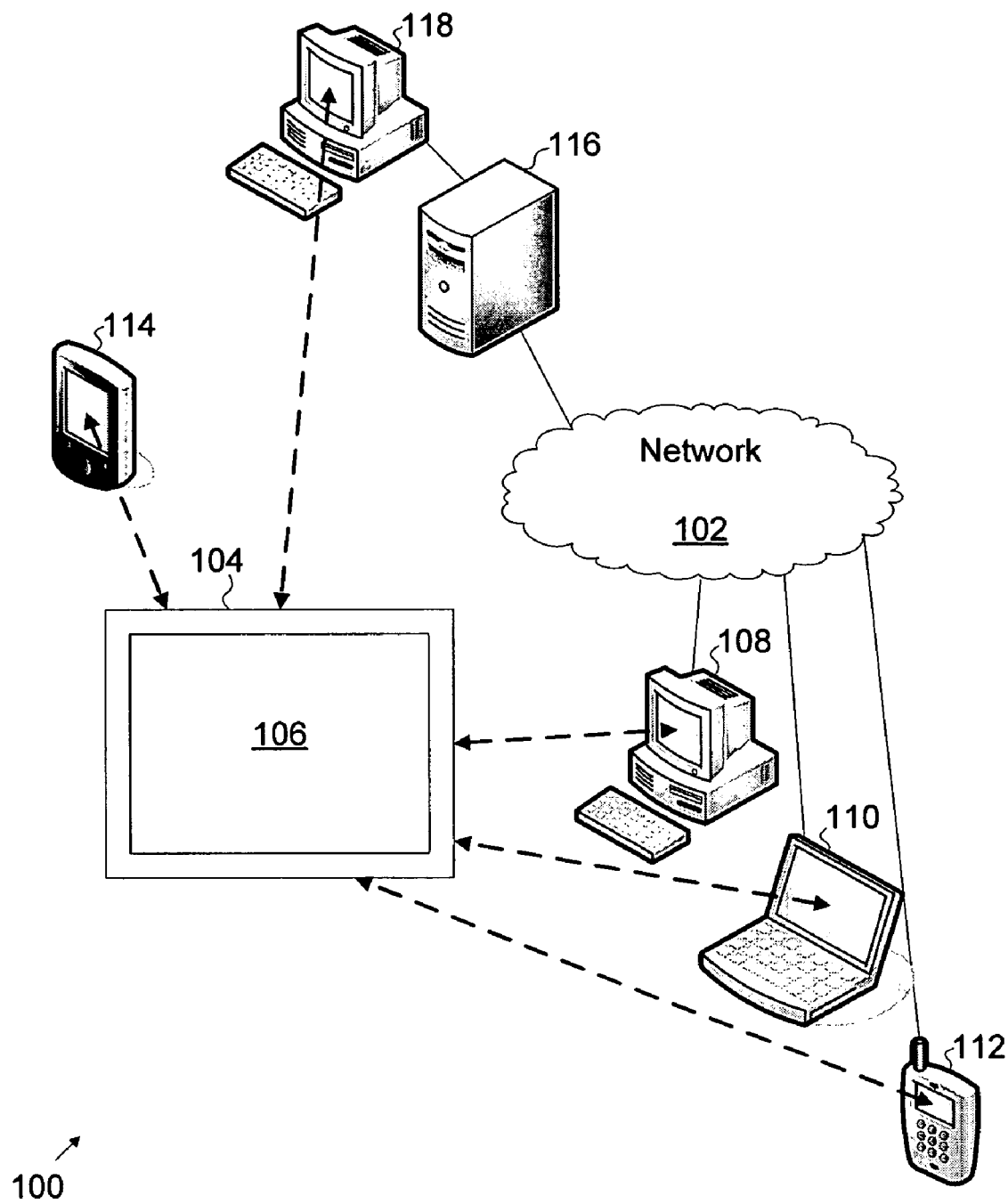
FIG. 1 illustrates an exemplary panel presentation system.

Various embodiments or examples may be implemented in numerous ways, including as a system, a process, an apparatus, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided as examples and the described techniques may be practiced according to the claims without some or all of the accompanying details. For clarity, technical material that is known in the technical fields related to the embodiments has not been described in detail to avoid unnecessarily obscuring the description.

Panel presentation is described, including implementing interfaces that provide more appealing user experiences while presenting additional information and content in an efficient and contextually-relevant manner. Panels, displays, palettes, tabs, windows, screens, or the like ("panels") provide packaged displayed of colors, styles, patterns, and other graphical elements. Panels may be used to provide information or data that is contextually relevant to other information or data in other panels without inhibiting user interaction or interface utility or functionality. In some examples, the graphical appearance of an interface may be modified by using panels that have a transparency level that, when invoked, allows a background panel layered over a foreground panel to become visible. When visible, new colors, styles, patterns, layouts, or other interface elements may be used to replace, supplement, or modify an interface or another panel. In other examples, a background panel used in an interface may be layered under a foreground panel. When invoked, a foreground panel slides toward a side or aside, revealing a portion or all of a background panel, which may include additional information associated with the foreground panel. A foreground panel may slide in any direction that permits viewing of a background panel, which may include information, data, or content ("content") that is related or not related to content included in the foreground panel.

The described techniques may be implemented as software, hardware, firmware, circuitry, or a combination thereof. If implemented as software, the described techniques may be implemented using various types of programming or formatting languages, frameworks, syntax, applications, protocols, objects, or techniques, including C, Objective C, C++, C#, Flex™, Fireworks®, Java™, Javascript™, AJAX, COBOL, Fortran, ADA, XML, HTML, DHTML, XHTML, HTTP, XMPP, and others. These may be varied and are not limited to the examples or descriptions provided.

FIG. 1 illustrates an exemplary panel presentation system. Here, system 100 includes network 102, display environment 104, interface 106, which may be presented on devices such as computer 108, notebook computer ("notebook" or "laptop") 10, smart phone 112, personal digital assistant ("PDA") 114, server 116, and administrator computer 118. In other examples, the number and type of devices may be varied and are not limited to those shown and described.

In some examples, panels may be presented on interface 106, which may be an interface for an application such as a web browsing program, shopping website, Internet content portal, client or desktop application for any purpose. Panels may be used to provide additional or supplemental information that may be contextually relevant to another panel presented in interface 106. Computer 108, notebook computer ("notebook" or "laptop") 110, smart phone 112, personal digital assistant ("PDA") 114, server 116, and administrator computer 118 may provide display parameters that are used to determine various types of display features and characteristics for panels presented in interface 106. Display parameters may be any type of parameter, metric, information, bit, byte, or other data that is interpreted, parsed, translated, called, operated upon, or used to render graphical or visual data. For example, an operating system installed on computer 108 may communicate (i.e., via an application programming interface ("API")) display parameters to another application installed on computer 108 to render (i.e., interpreting data and information to draw or display the data and information in an interface) one or more panels presented in interface 106. In some examples, different types of panels may be rendered in interface 106, including background and/or foreground panels, as described in greater detail below. Here, the above-described system and elements may be varied and are not limited to the descriptions or examples provided.

Figure 2A:
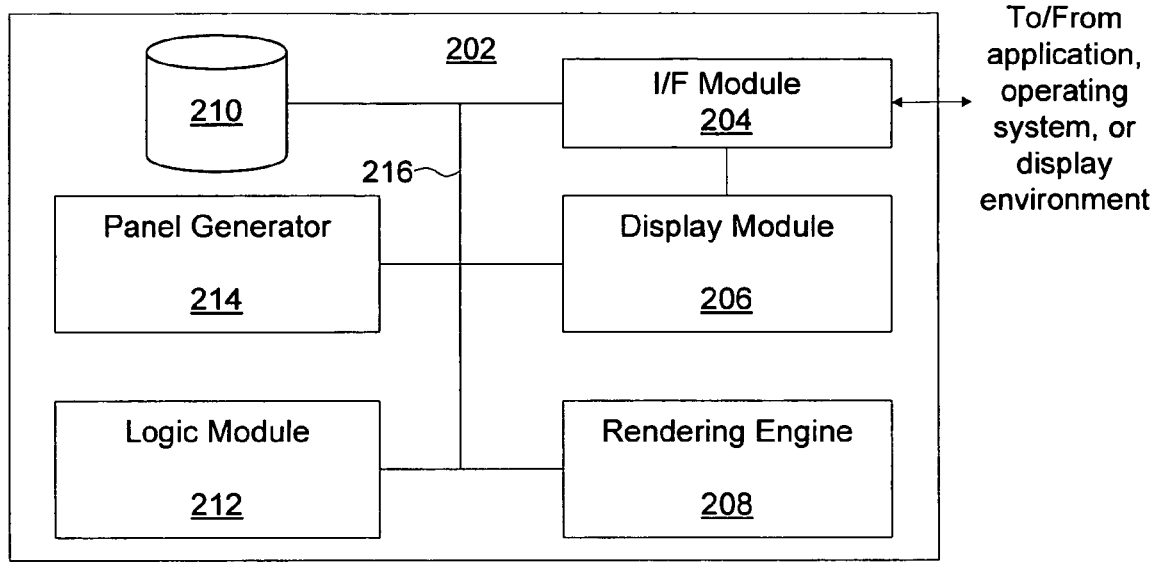
FIG. 2A illustrates an exemplary panel presentation application.

FIG. 2A illustrates an exemplary panel presentation application. Here, application 202 includes interface ("I/F") module 204, display module 206, rendering engine 208, repository 210, logic module 212, panel generator 214, and data bus 216. In some examples, the number and type of elements shown and described may be varied and are not limited to the descriptions provided. In some examples, the above-described elements may be implemented as part, component, or module of application 202. As an example, application 202 may be implemented as a computer aided or assisted drawing program (CAD) and have panel presentation functionality implemented as part of application 202. Logic module 212 may be implemented as software, hardware, circuitry, or a combination thereof to implement control logic for the described techniques for panel presentation.

In some examples, logic module 212 may be configured to control panel generator 214 and rendering engine 208, which may create display parameters and other data or information that, when communicated to a display (not shown), renders one or more panels on interface 106 (FIG. 1). Interface module 204 may send or receive display parameters and other data from application 202 to another application (e.g., a host, client, web services-based, distributed (i.e., enterprise), application programming interface ("API"), operating system, program, procedure or others) that may use data and information generated from panel generator 214 to render presented panels on a display screen. In other examples, the above-described techniques and elements may be varied in design, implementation, and function and are not limited to the descriptions provided.

Figure 2B:
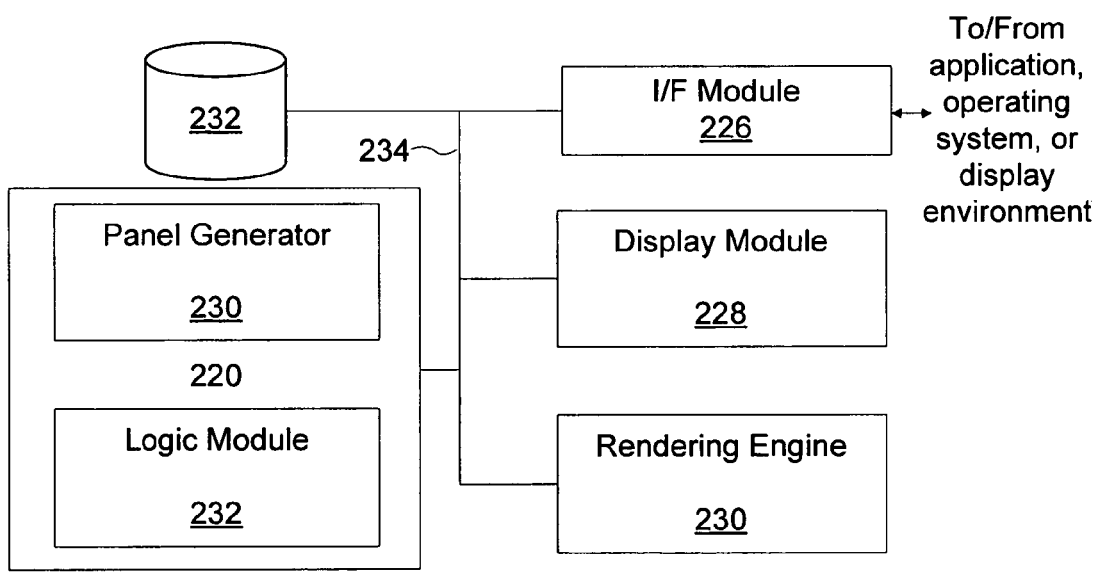
FIG. 2B illustrates an alternative exemplary panel presentation application.

FIG. 2B illustrates an alternative exemplary panel presentation application. Here, application 220 includes panel generator 222 and logic module 224. Further, application 220 is shown in data communication with interface ("I/F") module 226, display module 228, rendering engine 230, and repository 232. Data bus 234 may be configured to send or receive data among application 220, I/F module 226, display module 228, rendering engine 230, and repository 232. In other examples, more, fewer or different elements may be used and implemented without limitation to the examples provided above.

In some examples, logic module 224 and panel generator 222 may be implemented as part of application 220, which may be implemented separately from other functional components or modules, such as interface module 226, display module 228, rendering module 230, and repository 232. Data bus 234 may be implemented to communicate data over a given port between application 220 and interface module 226, display module 228, rendering module 230, and repository 232. In other words, application 220 may be implemented as a standalone application or as a component (i.e., module) of another application. Data or information (e.g., display parameters) associated with a panel may be stored in repository 232, which may be implemented using a database, data store, data warehouse, or any other type of data repository or structure. In other examples, more, fewer, or different modules may be used to implement the described techniques for panel presentation and are not limited to those provided.

Figure 3A:
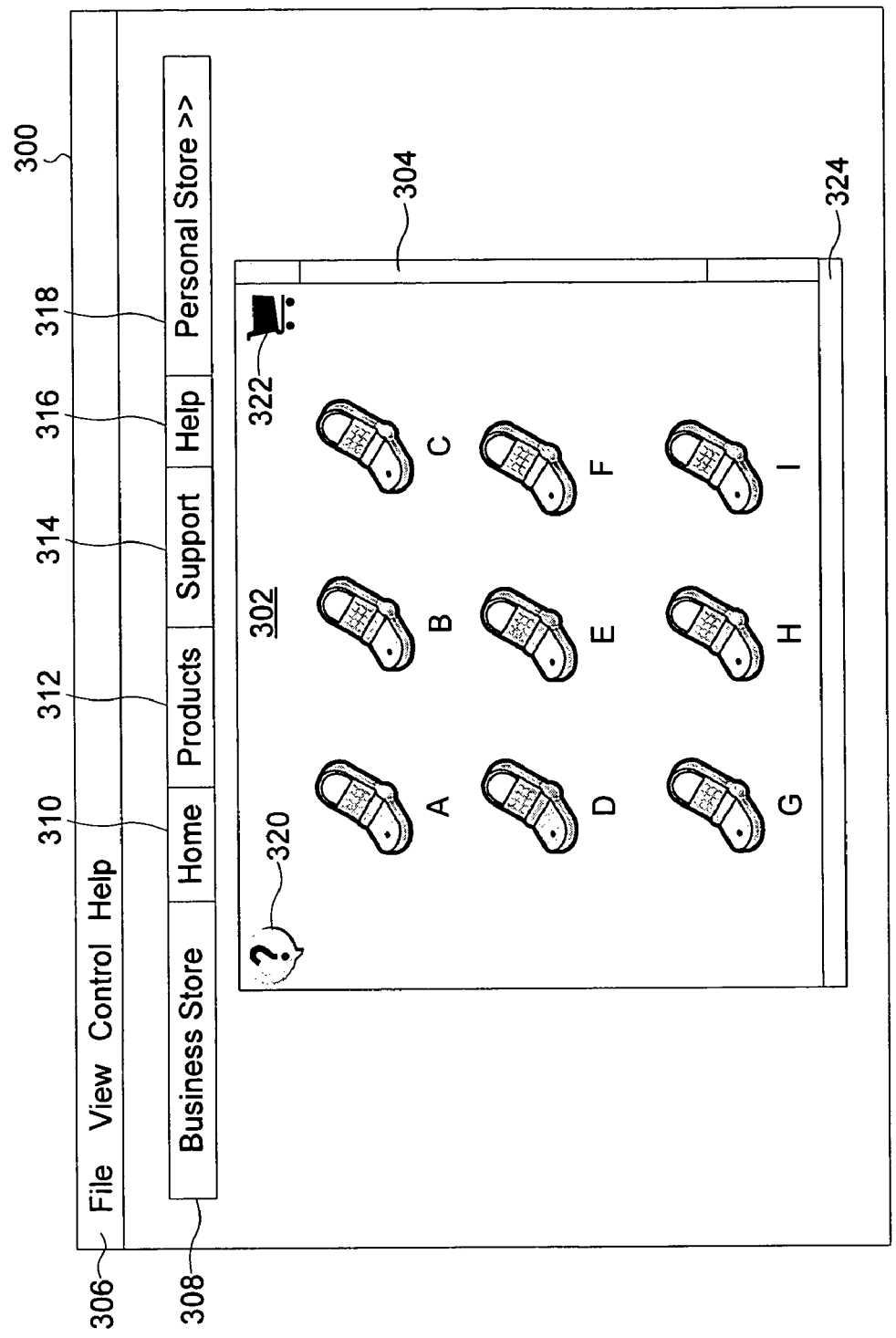
FIG. 3A illustrates an exemplary panel presentation interface.

FIG. 3A illustrates an exemplary panel presentation interface. Here, interface 300 includes foreground panel 302 with scroll bar 304, pull-down menu bar 306, and icons 308-322. In some examples, foreground panel 302 may be layered over background panel 324 and, when invoked, used to present new data, information, graphical, or visual effects, thus modifying interface 300. When presented, foreground panel 302 may be used to present any type of data, information, or other content. As an example, foreground panel 302 may be an electronic commerce ("e-commerce") website configured for users to shop for cell phones. Here, cell phones A-I are shown, which may be represented by interactive icons. When a user gesture is performed (e.g., a mouse click or other input received using an input/output device (not shown)), other information or data may be presented on background panel

324 when foreground panel 302 slides aside (i.e., toward a side of interface 300). More cell phones or other interactive content may be presented in foreground panel 302 and viewed using scroll bar 304.

In some examples, background panel 324 may be presented by sliding foreground panel 302 to a side or by adjusting the transparency level of background panel 324. As an example, background panel 324 may be used to present additional information when foreground panel 302 is rendered (i.e., presented) to appear as though sliding aside, thus revealing background panel 324. As another example, content on background panel 324 may be presented by adjusting the transparency level of background panel 324 from 100% to a visible level (e.g., 0%, 10%, 50%, and the like). Transparency may be rendered using various techniques including modifying alpha (α) values (i.e., RGBA (red-blue-green-alpha)) for the collection of pixels used to render an image transparently (i.e., α-channel values). For example, α-channel values may range, for example, from 255 to 0, which provides for opacity levels ranging from 100%, 75%, 50%, 25%, or 0%. Techniques such as interpolated, screen-door, and filtered transparency may be used to modify a z-buffer algorithm to invoke transparency of an image, thus producing an alpha value used to render a composite, blended, or layered image transparently. Techniques may also be performed for various types of image formats such as PNG, JPEG, and others. In other examples, different transparency techniques may be used and are not limited to the examples provided above.

Here, if icon 320 is clicked on, background panel 324 may be rendered when foreground panel 302 slides to a side and reveals a portion or all of background panel 324. In other examples, panels (i.e., foreground or background panels) may be slid in different or opposing directions to reveal background panel 324. When presented, background panel 324 may present additional information about a cell phone selected from foreground panel 302. Here, background panel 324 may be rendered without modifying content (i.e., cell phones A-I) rendered in foreground panel 302, thus enabling comprehensive information to be viewed without opening additional windows, display screens, or other application interfaces, providing a visually rich and comprehensive user experience. In other examples, the above-described techniques may be applied to any type of content or application where additional, related, or supplemental information is presented using background panel 324 to enhance content in foreground panel 302. For example, any type of website providing multiple hyperlinks ("links") or iconic representations of links to other information may be presented using foreground panel 302 and background panel 324. As another example, when any of icons 308-322 are selected, background panel 324 may be presented to provide the requested additional or supplemental information, without removing or obscuring foreground panel 302. The number, type, and appearance of icons 308-322 may be varied and is not limited in design, appearance, layout, style, or function to the examples provided. Further, pull-down menu 306 may also be varied and is not limited in design, appearance, layout, style, or function to the examples provided.

Figure 3B:
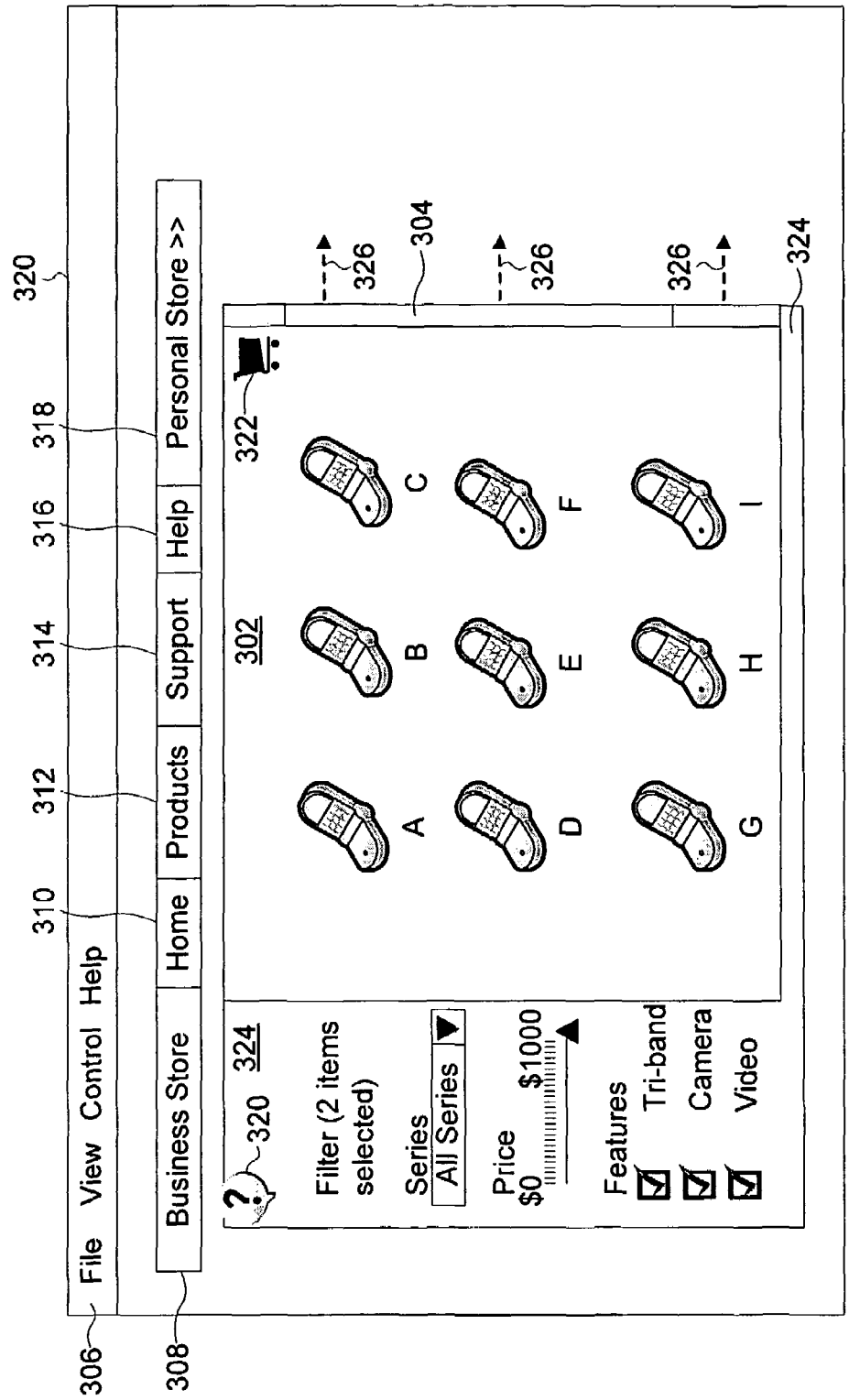
FIG. 3B illustrates an alternative exemplary panel presentation interface.

FIG. 3B illustrates an alternative exemplary panel presentation interface. Here, interface 320 includes foreground panel 302, scroll bar 304, pull-down menu bar 306, icons 308-322, and background panel 324. In some examples, when one or more of icons 308-322 are selected (i.e., interacted with by performing a user gesture (i.e., clicked on)), background panel 324 is made visible (i.e., rendered to appear) when foreground panel 302 slides in the direction of arrows 326. Foreground panel 302 may slide in the direction of arrows 326, but may also be implemented to slide in any direction to permit revelation of background panel 324. In other examples, background panel 324 may appear when foreground panel 302 is rendered differently.

Here, background panel 324 may be configured to present supplemental information related to information or data presented in foreground panel 302. For example, when foreground panel 302 slides aside to reveal background panel 324, contextually-relevant information or functions associated with the selection of one or more of cell phones A-I may be presented. Information does not need to be contextually-relevant and any information, features, functions, or other data may be presented on background panel 324. Data such as pricing, features, series, and other filtering criteria may be presented on background panel 324. In other examples, the information or data presented in background panel 324 may be implemented differently in design, appearance, content, layout, style, format, and the like. By presenting an additional panel for information and data without modifying content already presented in foreground panel 302, a user may continue to interact with the same interface (i.e., interface 320) without the disruption of opening new or additional interfaces, panels, windows, displays or screens. Further, the above-described features, functions, and elements shown may be implemented differently and are not limited to the examples provided.

Figure 3C:
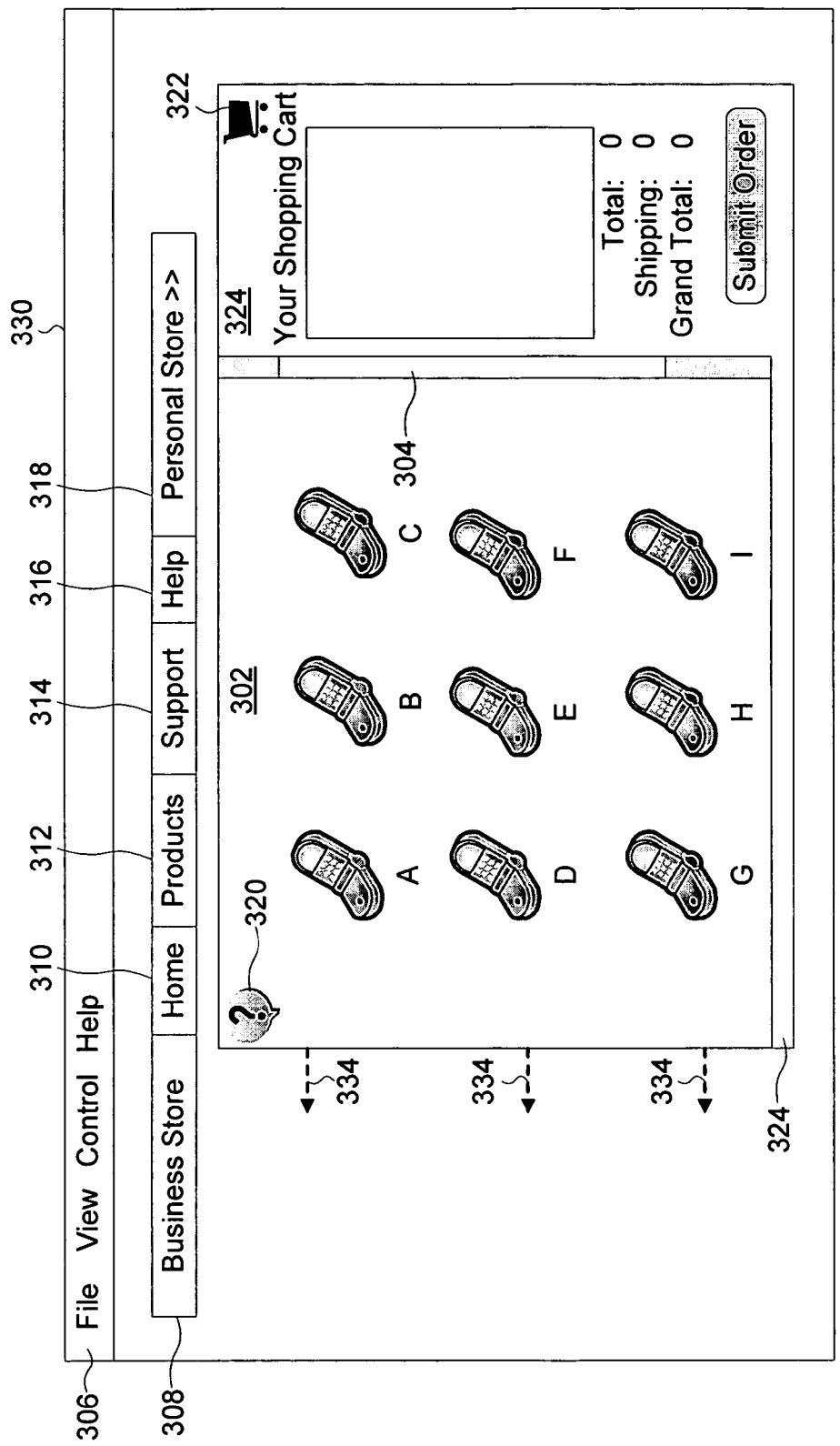
FIG. 3C illustrates an another alternative exemplary panel presentation interface.

FIG. 3C illustrates another alternative exemplary panel presentation interface. Here, interface 330 includes foreground panel 302, scroll bar 304, pull-down menu bar 306, icons 308-322, and background panel 324. In some examples, background panel 324, when invoked (i.e., selecting icon 322), is revealed when foreground panel 302 slides in the direction of arrows 334, which appear to be substantially opposite in direction to arrows 326 (FIG. 3B). In other words, the example shown provides another illustration of how interface 300 may be implemented to permit background panel 324 to be revealed when foreground panel 302 slides in a different direction. Foreground panel 302 may slide in other, different directions and is not limited to the examples provided.

When invoked, icon 322 may be transferred from foreground panel 302 to background panel 324, which also provides additional information that may or may not be contextually relevant to content displayed in foreground panel 302. For example, selecting a shopping cart-shaped icon (i.e., icon 322) may result in foreground panel 302 sliding to reveal prices, total amounts, and other information for items selected. Information such as items in a shopping cart, total, grand total, shipping, and other user actions (e.g., a button to "Submit Order") may also be presented and used. In other examples, background panel 324 may be used to present other information in different contexts and is not limited to the examples shown and described. For example, foreground panel 302 may present titles or abstracts of content articles and background 324, when a title or abstract is selected, presents the entire article, possibly using a scroll bar to permit viewing the article, when foreground panel 302 slides aside. As another example, background panel 324 may present any type of additional or more detailed information for content presented in foreground panel 302.

As yet another example, background panel 324 may be used to provide additional information associated with cell phones A-I shown in foreground panel 302. As another example, background panel 324 may be used to provide other information that may be associated with icons 308-318 or functions selected from pull-down menu bar 306. In still other examples, different types of icons may be provided in foreground panel 302. When invoked, different types of icons may invoke background panel 324 to provide additional or supplemental information, data, or content on background panel 324. Interface 330 and the elements shown and described may be varied in design, function, layout, format, style, and other implementation details and are not limited to the above-described examples.

Figure 3D:
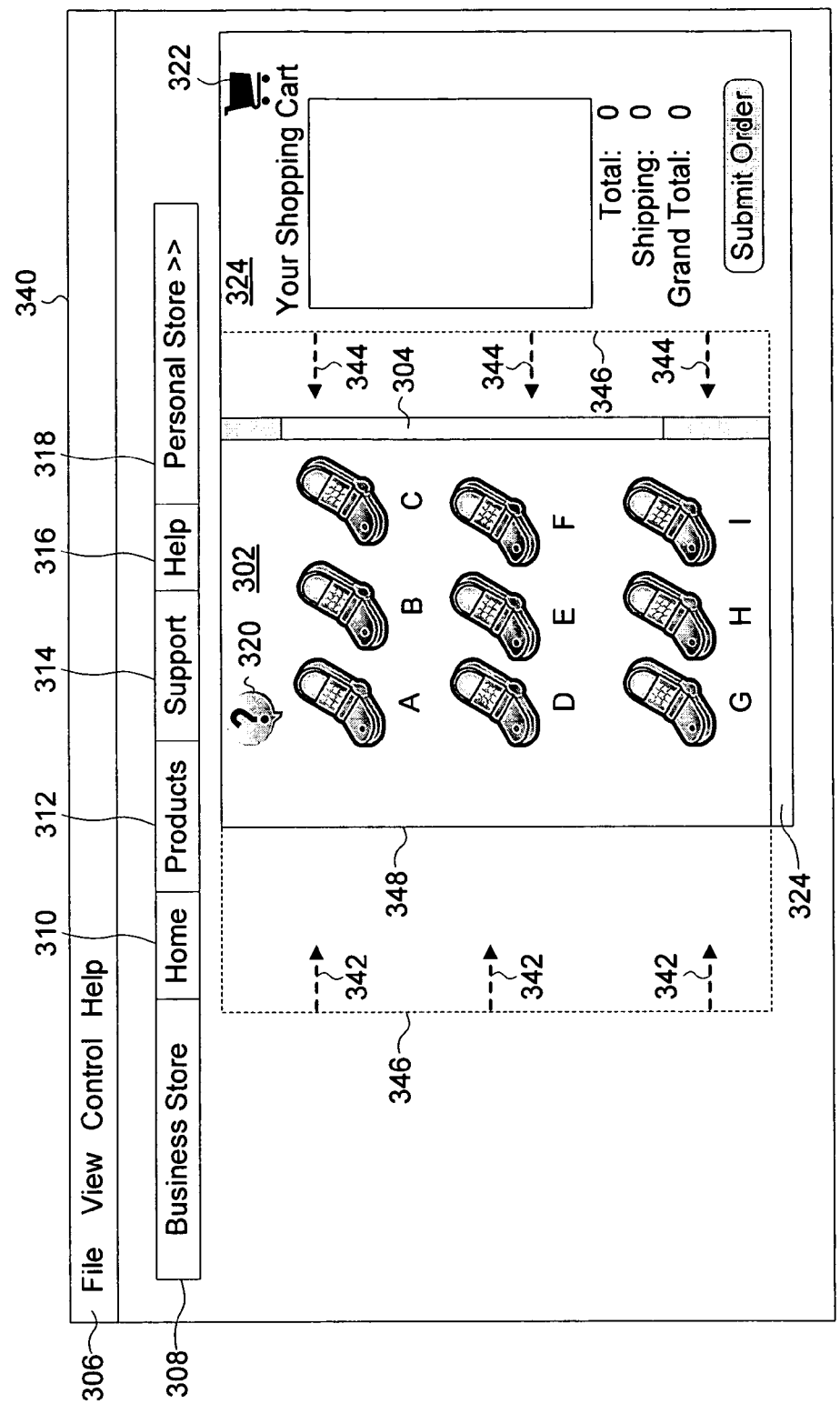
FIG. 3D illustrates yet another alternative exemplary panel presentation interface.

FIG. 3D illustrates yet another alternative exemplary panel presentation interface. Here, interface 340 includes foreground panel 302, scroll bar 304, pull-down menu bar 306, icons 308-322, and background panel 324. In some examples, foreground panel 302 may be "squeezed" (i.e., reducing the size or dimensions of foreground panel 302 by moving opposing borders of foreground panel 302 inwards, thus reducing the amount of space in foreground panel 302 while revealing background panel 324, which "appears" in the space reduced from foreground panel 302). In other examples, foreground panel 302 may be squeezed and slid to reveal (i.e., render) background panel 324 to one or more sides of foreground panel 302. The size of foreground panel 302 may be reduced symmetrically or asymmetrically and is not limited by the amount, direction, or geometry by which foreground panel 302 is reduced. Further, when foreground panel 302 is reduced in size, background panel 324 may be revealed. For example, when content (e.g., text and icons associated with cell phones A-I) are laid out closer together, foreground panel 302 may be reduced by squeezing its boundaries in the direction of arrows 342 and 344. Thus, as foreground panel 302 is reduced, the functions, content, or other information shown on background panel 324 is rendered or made visible. The broken (i.e., dashed) lines of borders 346 further illustrates the original, outer boundaries of foreground panel 302, which have been rendered as reduced (i.e., "squeezed") border 348. In other examples, foreground panel 302, background panel 324, and the other elements associated with interface 340 may be designed, laid out, and rendered differently and are not limited to the examples shown.

Figure 4A:
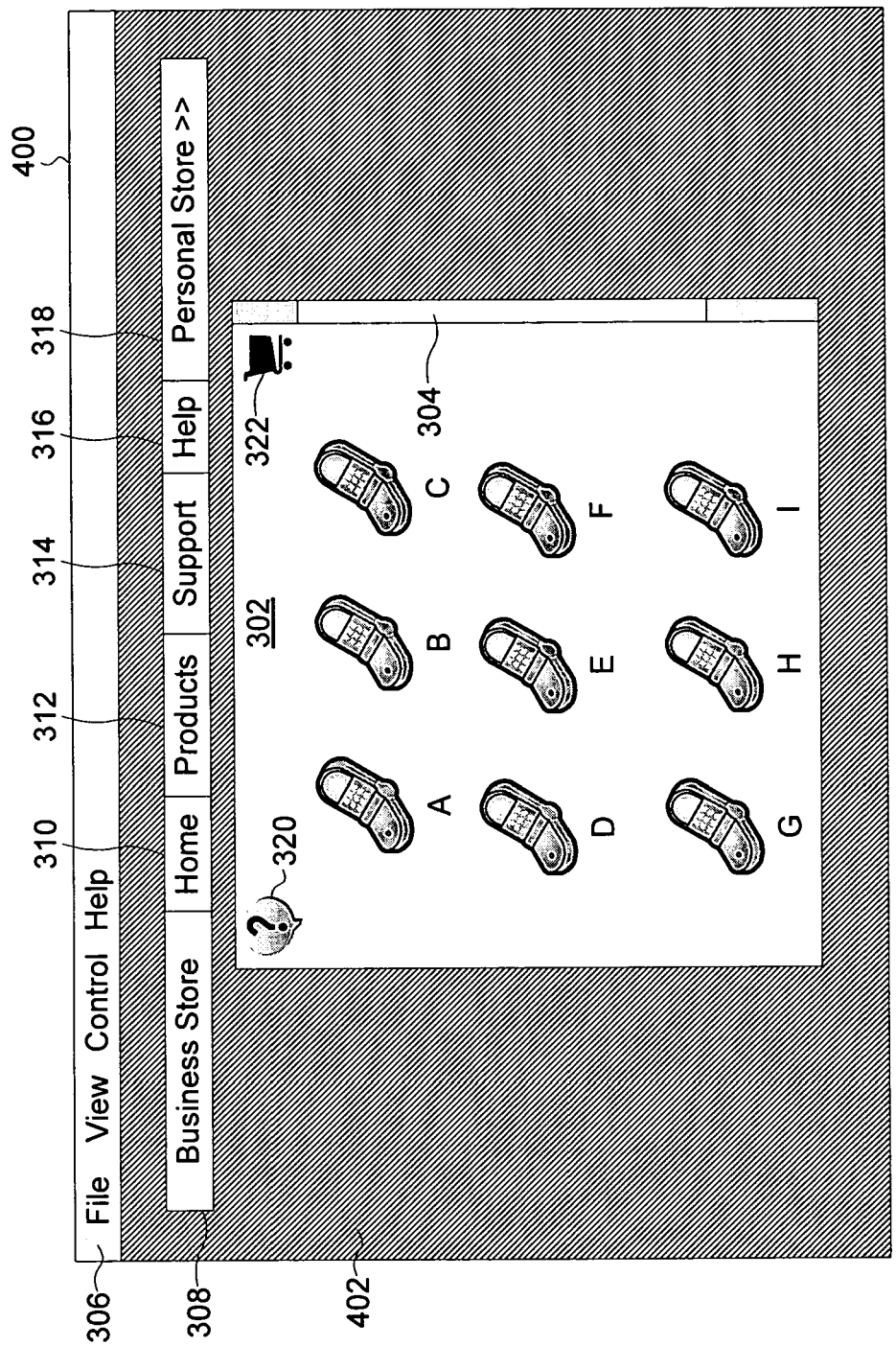
FIG. 4A illustrates an alternative exemplary panel presentation interface using variable opacity.

FIG. 4A illustrates an alternative exemplary panel presentation interface using variable opacity. Here, interface 400 includes foreground panel 302, scroll bar 304, pull-down menu bar 306, icons 308-322, and background panel 402. In some examples, background panel 402 may be implemented transparently. In other words, background panel 402 may be rendered as an overlay to foreground panel 302 and other interface elements (e.g., pull-down menu bar 306, icons 308-322, and the like). In some examples, foreground panel 302 and background panel 402 may be sized differently (e.g., have different pixel or other sizing dimensions) and, when overlaid, background panel 402 may extend from behind the edges of foreground panel 302. If background panel 402 and foreground panel 302 are different sizes, but overlaid, by rendering background panel 402 transparently (e.g., adjusting the transparency level of background panel 302 to 100% or opacity level to 0%), then foreground panel 302 is visible while background panel 402 is not. Further, when rendered visibly, background panel 402 may be configured to not overlap foreground panel 302, thus allowing content to be seen in the latter. Further, if background panel 402 is rendered transparently, a background pattern may already be present in interface 400, as shown here.

When implemented, background panel 402 may be used to provide a desired color, style, pattern, or other type of visual, graphical, audible, or other type of media-oriented appearance or skin. Further, background panel 402 may be implemented to not obscure already-presented interface elements (e.g., foreground panel 302, icons 308-322, pull-down menu bar 306, and others). Background panel 402 may be configured to provide a different background color, pattern, style, layout, or skin for interface 400. Further, background panel 402 may also be implemented by using various types of visual effects such as fading from 0% opacity (i.e., 100% transparency) to 100% opacity (i.e., 0% transparency), thus allowing new skins, backgrounds, patterns, styles, colors, fonts, layouts, or other visual effects to be implemented without switching to a different interface, screen, window, or other type of display. In other examples, interface 400, background panel 402, and the above-described elements may be implemented differently and are not limited to the design, function, style, layout, or descriptions provided.

Figure 4B:
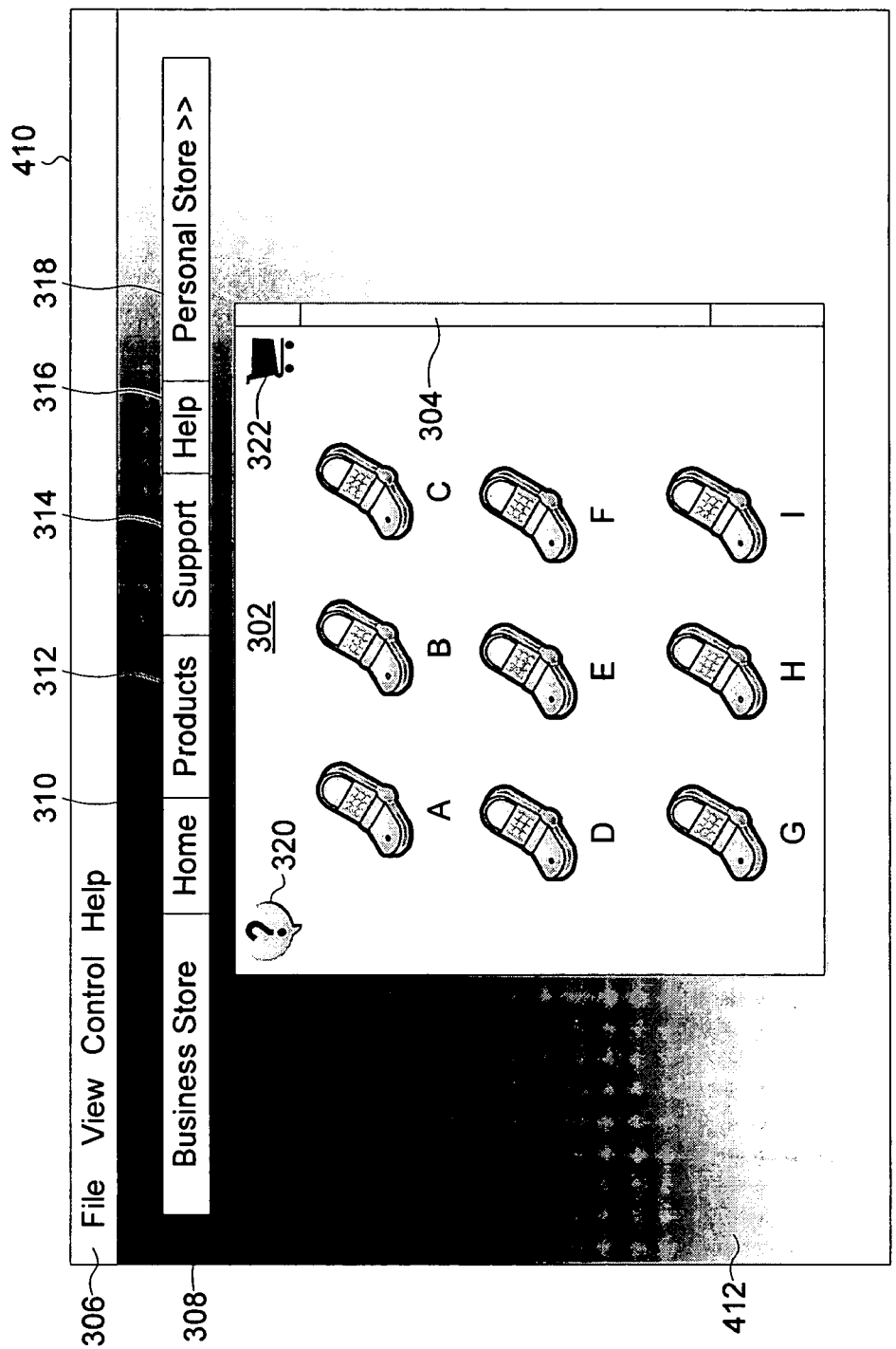
FIG. 4B illustrates another alternative exemplary panel presentation interface using variable opacity.

FIG. 4B illustrates another alternative exemplary panel presentation interface using variable opacity. Here, interface 410 includes foreground panel 302, scroll bar 304, pull-down menu bar 306, icons 308-322, and background panel 412. In some examples, any type of color, style, font, format, patterns, layout, or other visual, graphical, audible, or multimedia background may be implemented by background panel 412. As an example, a shaded, fading pattern for background panel 412 may transition (i.e., "flow") from the upper left region of background panel 412 to a clear, transparent or white palette in the lower right region. As an example, background panel 412 may be invoked when an icon (e.g., icons 308-322, and others) is selected, causing a change from background panel 402 (FIG. 4A) to background panel 412 shown here. In other examples, background panel 412 may be implemented using various types of change effects (e.g., fading, inward or outward spiraling, immediate transition of background panel 412 from 100% transparency to 100% opacity, and others).

Here when icon 318 is selected to transition from a "Business Store" view to a "Personal Store" view, background panel 402 may be transitioned to background panel 412. Icons 308-322 may be used to invoke the desired transition from one pattern (e.g., background panel 402) to another pattern (e.g., background panel 412) without having to invoke or open another application, window, display, screen, foreground panel, or other disruption to a current view or visual appearance.

In some examples, any number of background panels (e.g., background panel 402, 412, and others) may be layered and implemented by changing the transparency (i.e., the opacity) of one or more desired background panels. In still other examples, multiple (i.e., two or more) background panels may be implemented together by transitioning the desired background panels from 100% transparency to some degree (i.e., anything greater than 100% transparency or 0% opacity) of visibility. This may create alternative background patterns, colors, styles, and palettes for customizing interface 410 without having to open a new display, window, screen, or panel in the same or separate application. The above-described elements of interface 410 may be varied in design, implementation, function, layout, and other features without restriction or limitation to the examples provided.

Figure 4C:
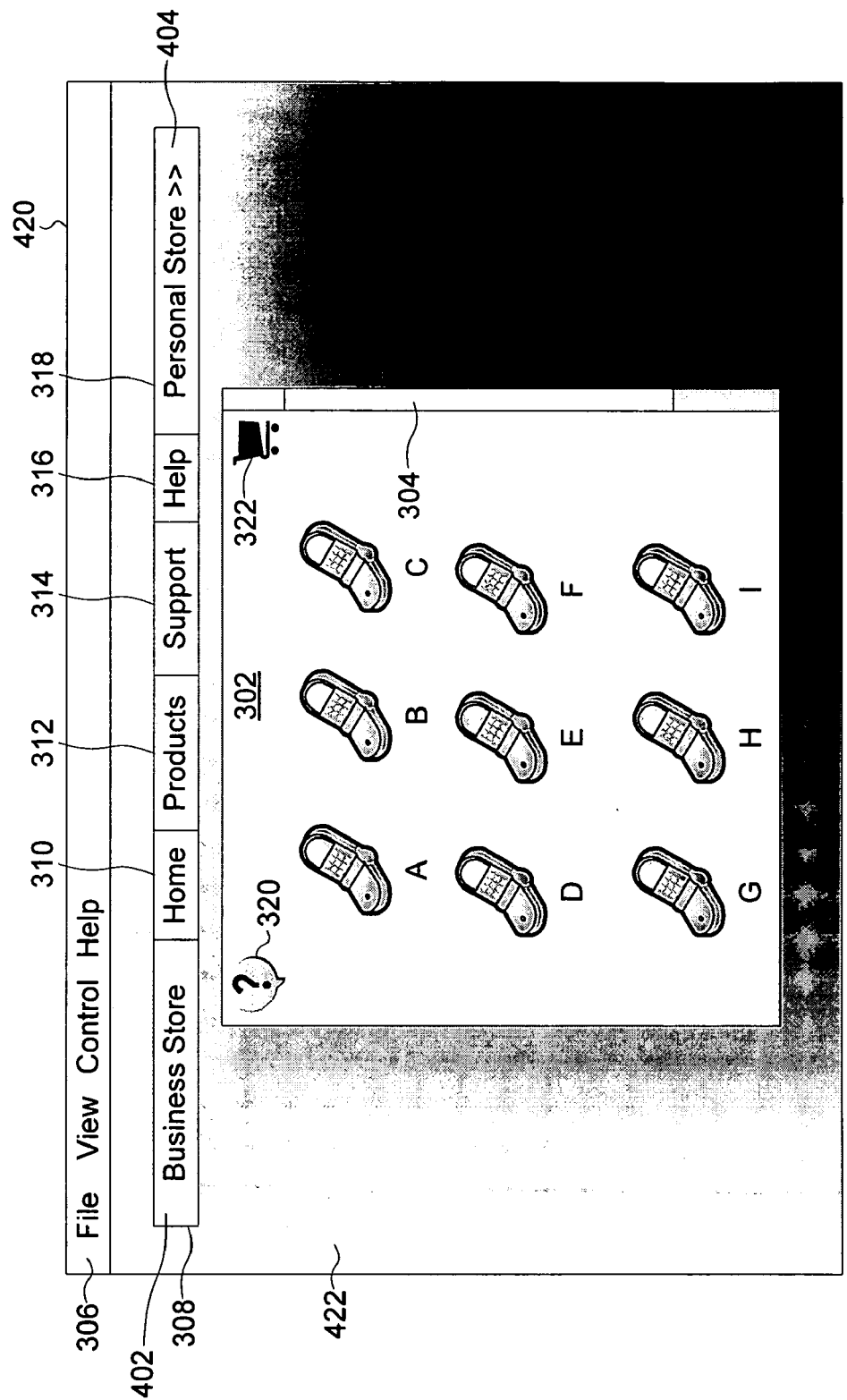
FIG. 4C illustrates yet another alternative exemplary panel presentation interface using variable opacity.

FIG. 4C illustrates yet another alternative exemplary panel presentation interface using variable opacity. Here, interface 420 includes foreground panel 302, scroll bar 304, pull-down menu bar 306, icons 308-322, and background panel 422. Interface 420 illustrates another example of a background panel (e.g., background panel 422) pattern, color, style, or layout that may be used with the techniques described herein. For example, the fading, shaded background of background panel 412 (FIG. 4B) may be implemented using an inverted pattern, providing a dark, shaded, solid pattern that flows from the lower right region of background panel 422 to a solid, white or clear, unbroken pattern in the upper left region of background panel 422. Likewise, any type of color, pattern, font, style, content, layout, design, transition pattern, or other visual or media-based feature may be used with panel presentation techniques such as those described above in connection with foreground and background panels. In some examples, panels (e.g., background or foreground) may be layered to provide additional content that, when invoked by a user gesture of any type, is presented on interface 420 without requiring the use of a separate application, browser, window, screen, or the like. In still other examples, the above-described elements and techniques may be implemented differently and are not limited to any of the examples or features provided.

Figure 5A:
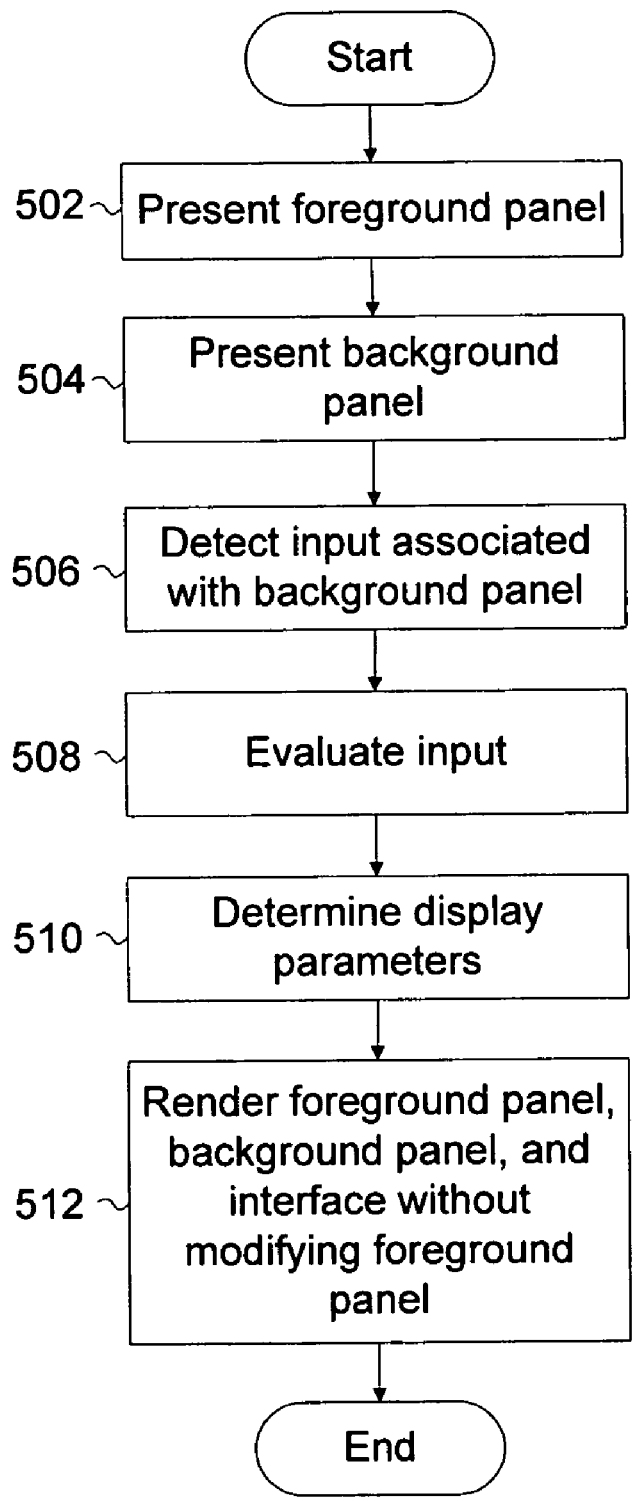
FIG. 5A illustrates an exemplary panel presentation process.

FIG. 5A illustrates an exemplary panel presentation process. Here, a foreground panel (e.g., foreground panel 302 (FIGS. 3A-3C, 4A-4C), and the like) is presented (502). One or more background panels (e.g., background panel 324 (FIGS. 3A-3C), 402 (FIG. 4A), 412 (FIG. 4B), 422 (FIG. 4C)) may be presented (504). Next, an input associated with background panel 324 is detected (506). In some examples, a detected input may be any type of user or system-initiated action, gesture, interaction, or other type of input that is received and detected by logic module 212. Further, an input associated with background panel 324 may be a user or system-generated command to invoke or modify a display parameter associated with background panel 324. Once detected, the input is evaluated to determine display parameters for rendering foreground panel 302 and background panel 324 (508). Based upon the evaluation of a detected input, display parameters are determined and used to render the elements of an interface, which may include foreground panel 302, background panel 324, icons 308-322, and other elements, as discussed above (510).

In some examples, display parameters may include information such as guidelines, restrictions, limitations, boundaries, or any other type of data that may be used to determine how to render content on a display (e.g., interface 300 (FIG. 3A), 320 (FIG. 3B), 330 (FIG. 3C), 400 (FIG. 4A), 410 (FIG. 4B), 420 (FIG. 4C), and others). Display parameters may provide, as an example, the color, style, layout, or design features to be drawn on an interface. Display parameters may also include whether other media-based effects should be included (e.g., sound, motion, animation, and others).

Here, display parameters are determined based on the detected user input and information or data associated with foreground panel 302 and background panel 324, if any. In other words, display parameters are used to determine how to render background panel 324 with foreground panel 302, including modifying the transparency (i.e., opacity) level or sliding of background panel 324 from behind foreground panel 302, as described above. After determining display parameters, foreground panel 302 and background panel 324 are rendered in an interface (512). In some examples, background panel 324 may be rendered to appear when foreground panel 302 slides to a side of interface 300 (FIG. 3A), for example. In other examples, both foreground panel 302 and background panel 324 may slide in substantially opposite or different directions to reveal background panel 324. In still other examples, background panel 324 may be configured to appear by modifying a transparency level. Once rendered, background panel 324 may modify the appearance of an interface by changing the skin of interface 400 (FIG. 4A) or any other elements of an interface (e.g., foreground panel, background panel, and the like). Further, the above-described process may be varied in design, implementation, and function and is not limited to the examples provided above.

Figure 5B:
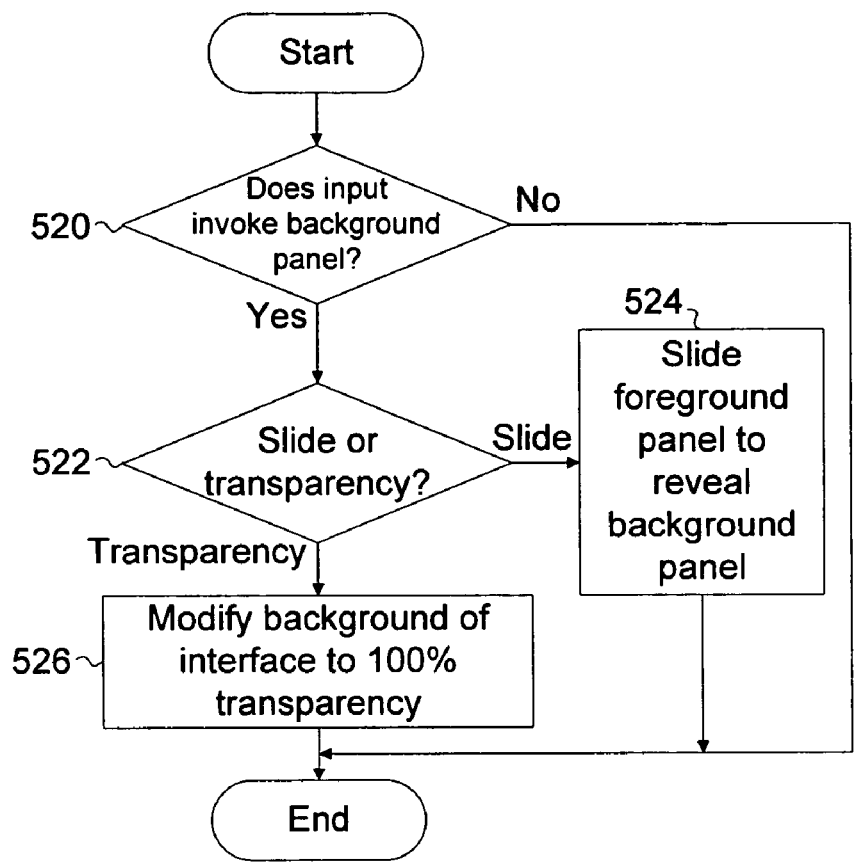
FIG. 5B illustrates an exemplary input evaluation process.

FIG. 5B illustrates an exemplary input evaluation process. Here, a determination is made as to whether the detected input is associated with invoking background panel 324 (FIGS. 3A-3C, 4A-4C) (520). If the detected input, as described above in connection with FIG. 5A, is not associated with invoking background panel 324, then the process ends and returns to 510 (FIG. 5A). However, if the detected input is associated with invoking background panel 324, then another determination is made as to whether the input initiates sliding (i.e., sliding foreground panel 302 (FIGS. 3A-3C, 4A-4C) aside to reveal background panel 324) or modifying the transparency (i.e., opacity) level of background panel 324 or foreground panel 302 (522). If the detected input indicates sliding foreground panel 302 to reveal background panel 324, then logic module 212 (FIGS. 2A-2B) generates the data used to render the sliding effect in interface 400 (FIG. 4A) (524). Data may include pixel, motion, animation, shading, colors, style, layout, or the like. If a determination is made that the detected input is associated with the transparency level of background panel 324, then the transparency level of background panel 324 is modified (526). In some examples, background panel 324 may be 100% or substantially transparent and, when the detected input is received, the transparency level may be changed to 0%, thus rendering background panel 324 partially or completely visible. In other examples, the transparency level of background panel 324 may be rendered 100% transparent, thus enabling another background or skin to appear without the combined effects of overlaid patterns, colors, styles, fonts, layouts, and the like. In other words, different types, numbers, and designs of panels may be layered in substantially the same region of an interface, which may allow different design effects to be implemented when a detected input invokes one or more of the background panels. Further, the above-described process may also be implemented with other types of panels (e.g., foreground panel 302, side panels, top panels, bottom panels, and the like) and is not limited to the examples provided. Further, the above-described process may be varied in design, implementation, and function and is not limited to the examples provided above.

Figure 6:
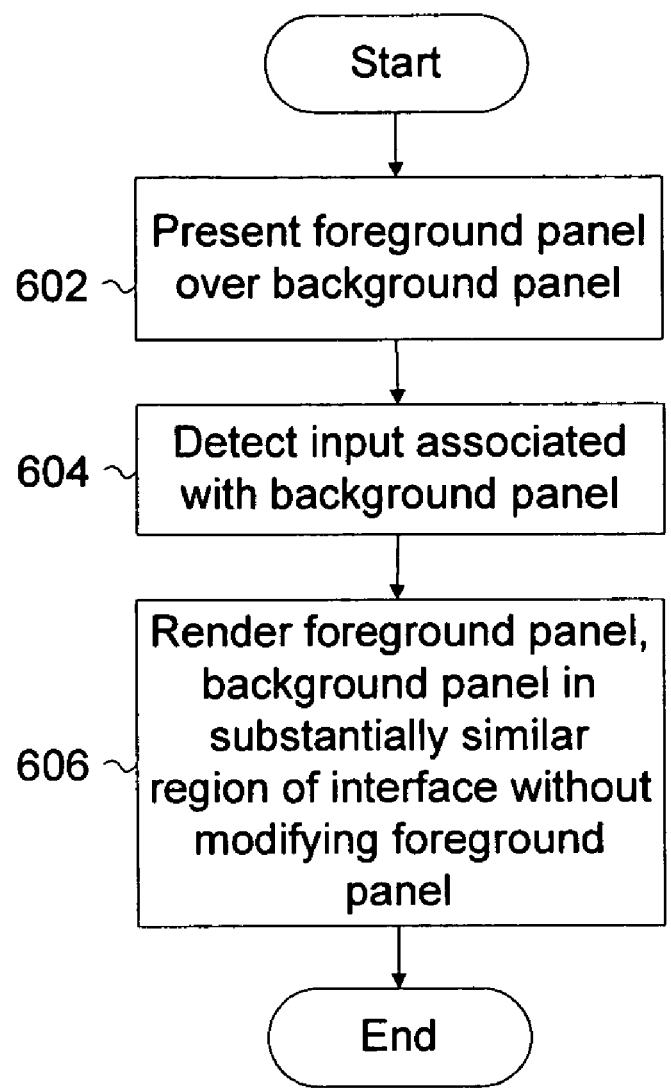
FIG. 6 illustrates an alternative exemplary panel presentation process.

FIG. 6 illustrates an alternative exemplary panel presentation process. Here, foreground panel (e.g., foreground panel 302 (FIGS. 3A-3C)) is presented over background panel (e.g., background panel 324 (FIGS. 3A-3C)) (602). In some examples, an input associated with background panel 324 is detected (604). An input may be a user gesture (e.g., selection or invocation using an icon (e.g., icons 308-322 (FIGS. 3A-3C and 4A-4C)) or a system-generated input (e.g., a command from a remote computer, a data command or call from an operating system on the same client, and the like). Once an input associated with a background panel has been detected, a foreground panel and the background panel may be rendered in substantially the same region of an interface, without modifying the foreground panel (606). A background panel may be rendered visible, providing a new pattern, color or set of colors, design, layout, or other appearance, thus modifying an interface while possibly supplementing content in a foreground panel. In some examples, content, information, or other data rendered in a foreground panel may not be affected by rendering a background panel visible. Background panels may be used to provide new, customized, or personalized skins, themes, appearances, or other graphical effects for an interface, without modifying content that a user wishes to view in a foreground panel. In other examples, the above-described process may be varied in design, implementation, and function and is not limited to the examples provided above.

Figure 7:
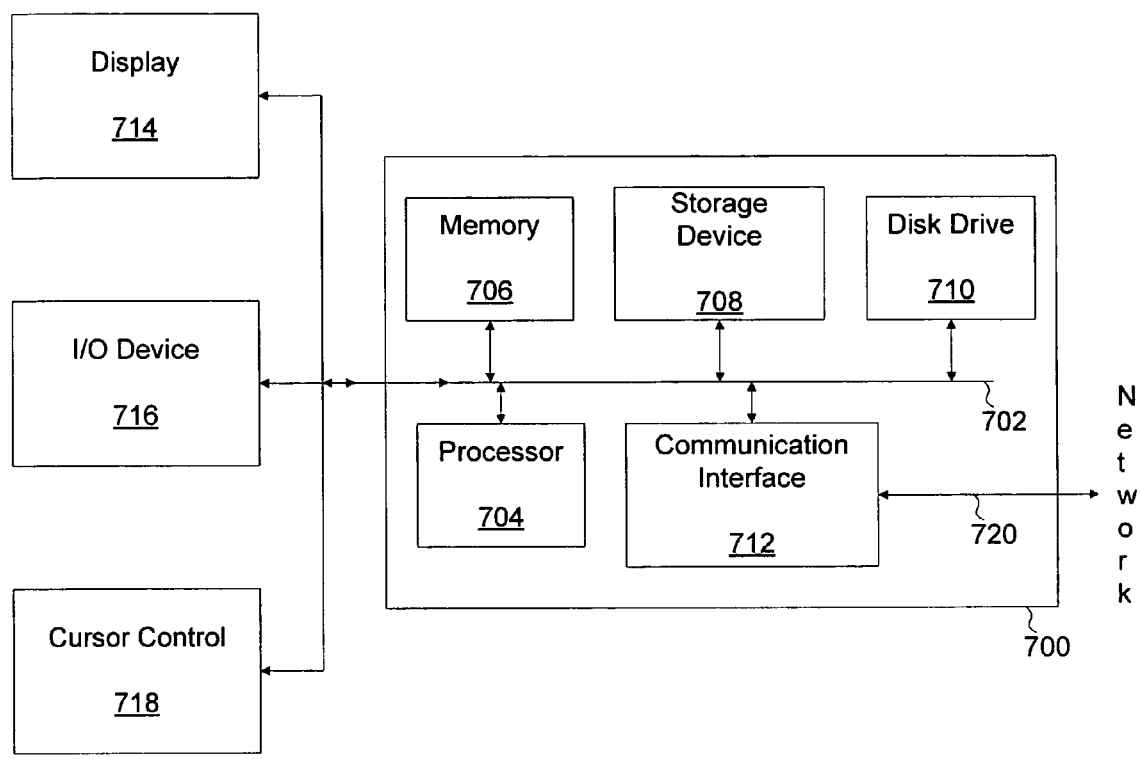
FIG. 7 illustrates an exemplary computer system suitable for panel presentation.

FIG. 7 illustrates an exemplary computer system suitable for panel presentation. In some examples, computer system 700 may be used to implement computer programs, applications, methods, processes, or other software to perform the above-described techniques. Computer system 700 includes a bus 702 or other communication mechanism for communicating information, which interconnects subsystems and devices, such as processor 704, system memory 706 (e.g., RAM), storage device 708 (e.g., ROM), disk drive 710 (e.g., magnetic or optical), communication interface 712 (e.g., modem or Ethernet card), display 714 (e.g., CRT or LCD), input device 716 (e.g., keyboard), and cursor control 718 (e.g., mouse or trackball).

According to some examples, computer system 700 performs specific operations by processor 704 executing one or more sequences of one or more instructions stored in system memory 706. Such instructions may be read into system memory 706 from another computer readable medium, such as static storage device 708 or disk drive 710. In some examples, hard-wired circuitry may be used in place of or in combination with software instructions for implementation.

The term "computer readable medium" refers to any medium that participates in providing instructions to processor 704 for execution. Such a medium may take many forms, including but not limited to, non-volatile media, volatile media, and transmission media. Non-volatile media includes, for example, optical or magnetic disks, such as disk drive 710. Volatile media includes dynamic memory, such as system memory 706. Transmission media includes coaxial cables, copper wire, and fiber optics, including wires that comprise bus 702. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In some examples, execution of the sequences of instructions may be performed by a single computer system 700. According to some examples, two or more computer systems 700 coupled by communication link 720 (e.g., LAN, PSTN, or wireless network) may perform the sequence of instructions in coordination with one another. Computer system 700 may transmit and receive messages, data, and instructions, including program, i.e., application code, through communication link 720 and communication interface 712. Received program code may be executed by processor 704 as it is received, and/or stored in disk drive 710, or other non-volatile storage for later execution.

The foregoing examples have been described in some detail for purposes of clarity of understanding, but are not limited to the details provided. There are many alternative ways and techniques for implementation. The disclosed examples are illustrative and not restrictive.

What is claimed:

1. A computer-implemented method, comprising:
   presenting a single window comprising a foreground panel and a background panel, in an interface;
      wherein the foreground panel displays foreground content; and
      wherein the background panel comprises a first portion of content in one area of the background panel and a second portion of content in another area of the background panel and wherein at least one of these portions of the background panel is hidden by the foreground panel;
   detecting an input associated with invoking the background panel;
   determining one or more display parameters associated with the foreground panel, the background panel, and the interface; and
   in response to said detecting, sliding or squeezing the foreground panel such that:
      the at least one hidden portion of the background panel is revealed, wherein to reveal the first portion of content a first edge of the foreground panel is moved in a first direction, and to reveal the second portion of the content a second edge of the foreground panel is moved in a second direction opposite from the first direction; and
      the foreground content remains displayed by the foreground panel.

2. The method of claim 1, wherein the foreground panel slides toward a side of the interface.

3. The method of claim 1, further comprising sliding the foreground panel to reveal the at least one hidden portion of the background panel in the interface, the background panel being layered under the foreground panel.

4. The method of claim 1, wherein the interface is of a web browsing application.

5. The method of claim 1, wherein the interface is of an application.

6. The method of claim 1, wherein the foreground panel is squeezed to provide space to render the at least one hidden portion of the background panel.

7. The method of claim 1, wherein the foreground panel and the background panel are rendered in a substantially similar region of the interface.

8. The method of claim 1, wherein the foreground panel and the background panel are layered in a substantially similar region of the interface.

9. The method of claim 8, further comprising rendering the background panel at least partially transparent, wherein the background and foreground panels are both overlaid over a background pattern of the interface such that said rendering the background panel at least partially transparent reveals at least a portion of the background pattern of the interface.

10. The method of claim 9, wherein a transparency level of the background panel is adjusted when the input is detected.

11. The method of claim 8, wherein the foreground panel provides a first skin and the background panel provides a second skin, the first skin or the second skin being visible based on the input.

12. The method of claim 8, wherein detecting the input further comprises detecting a user input associated with an icon, the icon being configured to invoke the portion of the background panel.

13. A computer-implemented method, comprising:
   presenting a foreground panel over a background panel in the same window wherein the background panel comprises a first portion of content in one area of the background panel and a second portion of content in another area of the background panel, and said presenting comprises:
      rendering the background panel and foreground panel wherein at least one of the portions of the background panel is hidden by the foreground panel;
      detecting an input associated with the background panel, the input being configured to invoke the background panel; and
      sliding or squeezing the foreground panel to reveal the at least one hidden portion of the background panel hidden by the foreground panel, such that:

to reveal the first portion of content a first edge of the foreground panel is moved in a first direction;

to reveal the second portion of content a second edge of the foreground panel is moved in a second direction opposite the first direction; and the foreground panel remains displayed.

14. The method of claim 13, wherein the foreground panel presents content and the background panel presents additional content, the additional content being associated with the content presented in the foreground panel.

15. The method of claim 13, wherein rendering the foreground panel and the background panel further comprises modifying a skin of the interface.

16. The method of claim 13, wherein the background panel, when invoked, modifies a graphical appearance of the interface.

17. The method of claim 13, wherein rendering the foreground panel and the background panel further comprises modifying an alpha value for the background panel, wherein the background and foreground panels are both overlaid over a background pattern of the interface such that said modifying the alpha value at least partially reveals the background pattern of the interface.

18. A system, comprising:

a processor; and a memory coupled to the processor and configured to store data executable by the processor to implement:

presenting a single window comprising a foreground panel, a background panel, and an interface;

wherein the foreground panel displays foreground content; and wherein the background panel comprises a first portion of content in one area of the background panel and a second portion of content in another area of the background panel and wherein at least one of these portions of the background panel is hidden by the foreground panel;

presenting the foreground panel;

detecting an input associated with invoking the background panel;

determining one or more display parameters associated with the foreground panel, the background panel, and the input; and in response to said detecting, sliding or squeezing the foreground panel such that:

the at least one hidden portion of the background panel is revealed, wherein to reveal the first portion of content a first edge of the foreground panel is moved in a first direction, and to reveal the second portion of the content a second edge of the foreground panel is moved in a second direction opposite from the first direction; and the foreground content is displayed by the foreground panel.

19. A system, comprising:

a processor; and a memory coupled to the processor storing program instructions executable by the processor to:

present a foreground panel over a background panel in a given window, wherein the background panel comprises a first portion of content in one area of the background panel and a second portion of content in another area of the background panel and at least one of the portions of the background panel is hidden by the foreground panel;

detect an input associated with the background panel, the input being configured to invoke the background panel, and slide or squeeze the foreground panel to reveal the at least one hidden portion of the background panel is not being hidden by the foreground panel, such that:

to reveal the first portion of content a first edge of the foreground panel is moved in a first direction;

to reveal the second portion of content a second edge of the foreground panel is moved in a second direction opposite the first direction; and the foreground panel remains displayed.

20. A computer program product embodied in a computer readable storage medium and comprising computer instructions for:

presenting a foreground panel and a background panel in a single window;

wherein the foreground panel displays foreground content; and wherein the background panel comprises a first portion of content in one area of the background panel and a second portion of content in another area of the background panel and wherein at least one of these portions of the background panel is hidden by the foreground panel;

detecting an input associated with invoking the background panel;

determining one or more display parameters associated with the foreground panel, the background panel, and the input; and in response to said detecting, sliding or squeezing the foreground panel, such that:

the at least one hidden portion of the background panel is revealed, wherein to reveal the first portion of content a first edge of the foreground panel is moved in a first direction, and to reveal the second portion of the content a second edge of the foreground panel is moved in a second direction opposite from the first direction; and the foreground content is displayed by the foreground panel.

21. A computer program product embodied in a computer readable storage medium and comprising computer instructions for:

presenting a foreground panel over a background panel in a given window, wherein the background panel comprises a first portion of content in one area of the background panel and a second portion of content in another area of the background panel and said presenting comprises:

presenting the background panel and foreground panel wherein at least one of the portions of the background panel is hidden by the foreground panel;

detecting an input associated with the background panel, the input being configured to invoke the background panel; and sliding or squeezing the foreground panel to reveal the at least one hidden portion of the background panel hidden by the foreground panel, such that:

to reveal the first portion of content a first edge of the foreground panel is moved in a first direction;

to reveal the second portion of content a second edge of the foreground panel is moved in a second direction opposite the first direction; and the foreground panel remains displayed.

* * * * *